(12) United States Patent
Armstrong (10) Patent No.: US 11,473,786 B2
(45) Date of Patent: Oct. 18, 2022

(54) CONNECTOR FOR A WATER SYSTEM (71) Applicant: Russell Winston Armstrong, Chellaston (GB)

(72) Inventor: Russell Winston Armstrong, Chellaston (GB)

(*) Notice: Subject to any disclaimer, the term of this patent is extended or adjusted under 35 U.S.C. 154(b) by 0 days.

(21) Appl. No.: 16/761,076

(22) PCT Filed: Oct. 24, 2018

(86) PCT No.: PCT/GB2018/053070
§ 371 (c)(1),
(2) Date: May 1, 2020

(87) PCT Pub. No.: WO2019/086836
PCT Pub. Date: May 9, 2019

(65) Prior Publication Data
US 2021/0010682 A1 Jan. 14, 2021

(30) Foreign Application Priority Data
Nov. 2, 2017 (GB) ..................... 1718199

(51) Int. Cl.
*F24D 19/08* (2006.01)
*F16K 37/00* (2006.01)
(Continued)

(52) U.S. Cl.
CPC ............ *F24D 19/088* (2013.01); *E03B 1/048* (2013.01); *E03B 7/08* (2013.01); *E03B 9/14* (2013.01);
(Continued)

(58) Field of Classification Search
CPC ......... Y10T 137/8158; Y10T 137/8342; Y10T 137/5762; G05B 2219/37371;
(Continued)

(56) References Cited

U.S. PATENT DOCUMENTS 8,172,154 B1 * 5/2012 Figley ...................... F24F 11/30 236/44 A
2011/0132474 A1 6/2011 Reese et al.
(Continued)

FOREIGN PATENT DOCUMENTS

DE 20 2005 002415 U1 4/2005
DE 20 2012 103132 U1 11/2013
(Continued)

OTHER PUBLICATIONS

International Search Report and Written Opinion dated Jan. 24, 2019 for PCT/GB2018/053070.
(Continued)

*Primary Examiner* — Atif H Chaudry
(74) *Attorney, Agent, or Firm* — Moser Taboada (57) ABSTRACT

The present invention relates to a connector (100) for a water system. The connector comprises an inlet connector (105), a connector body and an outlet connector (120) arranged in sequence. The connector body is open-sided so as to form a tundish having an open air gap between the inlet and outlet connectors (105, 120), through which water can fall in use. The connector (100) further comprises a sensor for detecting the presence of water within the connector body.

18 Claims, 4 Drawing Sheets

(51) Int. Cl.
  *G05B 19/042* (2006.01)
  *E03C 1/242* (2006.01)
  *E03C 1/10* (2006.01)
  *E03C 1/122* (2006.01)
  *F24F 11/30* (2018.01)
  *E03B 7/08* (2006.01)
  *E03B 1/04* (2006.01)
  *F24H 8/00* (2022.01)
  *E03B 9/14* (2006.01)

(52) U.S. Cl.
  CPC .............. *E03C 1/102* (2013.01); *E03C 1/104* (2013.01); *E03C 1/1225* (2013.01); *E03C 1/242* (2013.01); *F16K 37/005* (2013.01); *F24D 19/087* (2013.01); *F24F 11/30* (2018.01); *F24H 8/006* (2013.01); *G05B 19/0428* (2013.01); *G05B 2219/37371* (2013.01); *G05B 2223/06* (2018.08); *Y10T 137/5762* (2015.04); *Y10T 137/8158* (2015.04); *Y10T 137/8342* (2015.04)

(58) Field of Classification Search
  CPC . G05B 19/0428; G05B 2223/06; E03C 1/102; E03C 1/1225; E03C 1/1041; E03C 1/242; F24D 19/088; F24H 8/006; F25D 21/01; E03B 1/048; E03B 7/08; F24F 11/30
  See application file for complete search history.

(56) References Cited

U.S. PATENT DOCUMENTS

2016/0333559 A1   11/2016  Armstrong
2017/0278372 A1*   9/2017  Doughty ................ G08B 21/12

FOREIGN PATENT DOCUMENTS

| EP | 3128087 | A2 | | 2/2017 | |
|---|---|---|---|---|---|
| EP | 3 222 982 | A1 | | 9/2017 | |
| GB | 2 522 634 | A | | 8/2015 | |
| GB | 2 541 102 | A | | 2/2017 | |
| GB | 2541102 | A | * | 2/2017 | ......... F24D 19/1006 |
| WO | WO 02/18824 | A1 | | 3/2002 | |
| WO | WO-2015114348 | A1 | * | 8/2015 | ............. E03B 7/077 |

OTHER PUBLICATIONS

GB Search Report dated Apr. 23, 2018 for GB1718199.1.
European Search Report dated Dec. 15, 2016 for EP3128087 A3.

* cited by examiner

CONNECTOR FOR A WATER SYSTEM

BACKGROUND OF THE INVENTION

The present invention relates to a plumbing device which allows a pressure and/or temperature relief valve for a fresh water system to be connected to a waste pipe or soil stack without the risk of back contamination or odours.

An example of the use of a relief valve is with an unvented domestic hot water storage system (UVHWSS) or unvented hot water heater (UVHWH). Such a system typically has a temperature and/or pressure relief valve connected to a discharge pipe. The regulations for connection of the discharge pipe to a waste water system are strict because of the risk of back contamination from the pathogenic water in the waste water system to the fresh water in the storage system. Typically, the regulations require a tundish to provide a visible point of discharge and an air gap (to provide backflow prevention) and the outflow from the tundish to be connected in a particular way to discharge above an external ground floor gulley. Such a connection requires careful engineering and is expensive to install.

For boiler applications, backflow contamination is typically not an issue but the visibility of a point of discharge from a boiler remains relevant.

In order to connect a vent valve to a sewer, i.e. at a soil stack within a building, arrangements need to be made to provide an odour trap to prevent any foul gases from the soil stack from entering the domestic location. On most domestic installations, a water trap would be used to prevent escape of gases and odours from the soil stack. Typically, a water trap comprises a bent tube in which water is trapped. A water trap allows passage of liquid and suspended solids but not gases. Generally speaking, a water trap is not suitable for use with a tundish as it will become ineffective through drying out. A water trap is also relatively bulky and is not suitable for use in all locations.

The applicant's own prior patent applications GB2522634 and GB2541476 disclose a plumbing connector with a non-return valve so as to provide a dry trap tundish. Whilst such products mitigate the above described technical challenges, ongoing development work has revealed that further improvement to the products disclosed in the applicant's prior patent applications is possible. The present disclosure concerns such developments.

Whilst the air opening in the connectors disclosed in GB2522634 and GB2541476 allows visibility of a water discharge from the domestic hot water storage system, it is often the case that the discharge is not witnessed. It can be that the actual discharge is short-lived or else that a sporadic discharge occurs only intermittently, thereby reducing the likelihood that it will be seen.

If a discharge goes unnoticed and the user takes steps to recommence use of a boiler, for example by topping up the boiler pressure, then this can worsen the cause of the discharge. Ongoing or worsening leaks can potentially lead to permanent damage of the how water system and/or hazardous conditions for the user.

Discharge of water at a temperature close to boiling can result in damage to downstream pipework, which can lead to costly repairs and/or hazardous situations.

A way of ameliorating these problems has been sought.

BRIEF SUMMARY OF THE INVENTION

According to the invention, there is provided a connector for a water system, the connector comprising an inlet connector, a connector body and an outlet connector arranged in sequence, wherein the connector body is open-sided so as to form an open air gap between the inlet and outlet through which water can fall in use, the connector comprising a sensor for detecting the presence of water within the connector body.

The connector body may comprise an internal floor formation between the inlet connector and outlet connector, e.g. beneath the open air gap defined by the open-sided connector body. The floor formation may divide the interior of the connector body into upper and lower internal chamber portions.

The sensor may be arranged to sense the presence of water above or on the internal floor formation.

An opening, e.g. a valve opening may be formed in a floor of the lower chamber.

The inlet connector may be supported above the open upper chamber by one or more arms.

The lower chamber may be closable by a non-return valve which is arranged to open at a pre-selected pressure, e.g. according to a predetermined weight of water acting thereon.

The sensor may be suspended from the connector body.

The sensor may be mounted above the valve

The sensor may comprise one or more conductor.

The sensor may comprise a moisture/water sensor. Additionally or alternatively, the sensor may comprise a temperature sensor, e.g. a water temperature sensor.

The connector may comprise a non-return valve within the connector body. The sensor may sense the opening and/or duration of opening of the non-return valve.

A monitoring device may comprise or be connected to, or in communication with, the sensor. The monitoring device may generate an alert upon sensing the presence of water in the connector body.

The monitoring device may output a plurality of different alert outputs according to different sensor outputs, such as any or any combination of frequency of sensing an alert condition, duration of sensing an alert condition and/or one or more threshold valve of a sensed condition/parameter.

The monitoring device may output a plurality of different alert priority levels according to one or more sensed condition/parameter.

According to a further aspect of the invention, there is provided a monitoring controller for a hot water system arranged to receive sensor readings from the sensor of the first aspect, the monitoring controller comprising machine readable instructions for processing the received sensor readings and outputting a plurality of different alerts according to a duration and/or frequency of the received sensor readings.

BRIEF DESCRIPTION OF THE DRAWINGS

Embodiments will now be described by way of example only, with reference to the Figures, in which.

DETAILED DESCRIPTION

Figure 1:
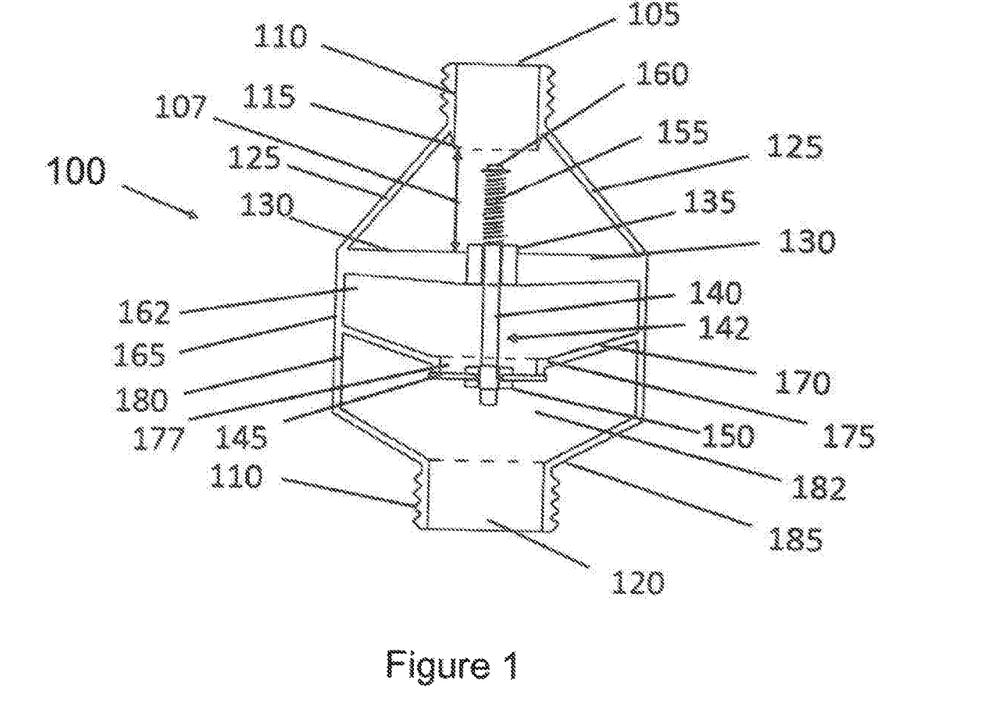
FIG. 1 is a vertical section view through a connector to which the present invention may be applied.

A first example of a connector is indicated generally at 100 as shown in FIG. 1. Connector 100 has an inlet 105, an upper chamber 162, a middle chamber 177, a lower chamber 182 and a lift valve indicated at 142.

Inlet 105 is supported above upper chamber 162 by a pair of diametrically opposed arms 125 such that a vertical gap 107 is formed between the inlet and the upper chamber 162. Inlet 105 has an outer thread 110 for engaging with a tap connector (or other pipe fitting) and forms a tapered beak drip 115 which projects downwards into the vertical gap 107. Although a specific connector form is shown, it will be appreciated that other types of connector formation or fitting could be used dependent on the pipe fitting to be connected.

Arms 125 are arranged so that the vertical gap 107 is of a height sufficient to provide an air brake to drain, e.g. suitable for connection to a soil or foul drain in potable water applications.

Upper chamber 162 is shaped by circumferential upper chamber wall 165 and a shelving upper chamber floor 170. Upper chamber 162 has an open mouth for receiving liquid from the inlet. The upper chamber wall 165 supports arms 125, which depend from an upper edge of the wall 165. Upper chamber floor 170 forms upper chamber floor opening 175 which is the opening to tubular middle chamber 177 such that upper chamber floor 170 has an inverted truncated conical shape and such that the upper chamber floor 170 has a funnel shape for directing liquid to the middle chamber 177 and/or the upper chamber floor opening 175.

Upper chamber wall 165 has inwardly projecting arms, in the form of struts/ribs 130, which support valve guide 135, typically arranged in the centre of the opening to upper chamber 162. One, two, three or more ribs 130 could be used.

Upper chamber wall 165 is generally annular in form so as to define the upper chamber as an open-ended drum. The rib(s) 130 depend into the interior space within the wall 165.

The lift valve 142 has the following components: a valve stem 140, a valve member/disc 145, a valve member fixing 150, a valve spring 155 and a valve spring clip 160. The valve stem 140 is arranged to run through valve guide 135. At an upper part of the valve stem 140 above the valve guide 135, valve spring 155 is arranged on the valve stem 140 and secured to an upper end of the valve stem 140 by valve spring clip 160. At a lower end of the valve stem 140, the valve disc 145 is secured by valve disc fixing 150. Valve disc 145 is formed from a resilient material such as a plastics or rubber material, for example EPDM rubber.

In an alternative embodiment, the valve spring 155 may be replaced by a suitable resilient member as would be known to a person of skill in the art.

The tubular middle chamber 177 has a lower opening which forms a valve seat for lift valve 142 and which lower opening is normally closed by valve disc 145 which is biased by the valve spring 155 into that position. The valve spring 155 is arranged to open the lift valve 142 at a pre-selected pressure on the valve disc 145. A suitable pre-selected pressure may be that determined by when the tubular middle chamber 177 is full of liquid.

The lower chamber 182 has a ceiling 170,177, a tubular lower chamber wall 180 and a shelving lower chamber floor 185. The ceiling 170,177 of the lower chamber 182 is formed by the upper chamber floor 170 and middle chamber 177 and forms an opening which is normally closed by valve 142. Lower chamber floor 185 shelves to form an opening for outlet 120 such that lower chamber floor 185 has an inverted truncated conical shape and such that the lower chamber floor 185 has a funnel shape for directing liquid to outlet 120. The outlet 120 is thus smaller in width/diameter than the width/diameter of the lower chamber 182

The upper and lower chambers may be of the same lateral, width dimension.

Outlet 120 has a tubular shape and has an outer thread 110 for engaging with a tap connector (or other pipe fitting). Other connector fittings could be provided at the outlet as required. Furthermore, the outlet 120 and/or lower chamber geometry could be modified to provide for different flow regimes and/or flow rates as desired.

In an alternative embodiment, the diameter of valve disc 145 may be less than that for outlet 120 such that the valve spring 155 and/or valve disc 145 may be replaced by removing valve spring clip 160, allowing the lift valve 142 to drop through outlet 120 and out of the connector 100 so that one or more of the components of lift valve 142 may be replaced.

When connected for use, a flow, e.g. a leakage flow, enters the connector 100 through the inlet 105 and collects as a small pool in the middle chamber 177. When sufficient weight is applied to the valve member 145, the resilient bias of the spring 155 will be overcome and the spring will be deformed/compressed as the valve member 145 and stem 140 move downward. Thus the valve will open and the water can pass through the valve 142 into the lower chamber and through the connector outlet 120.

A viewer can see the water flowing into the upper chamber from the inlet via the gap 107 if present at the time of operation. The gap 107 provides an open window.

Depending on the flow entering the connector 100, a sufficient pool of water may take a shorter or longer time to collect for valve operation.

Figure 2:
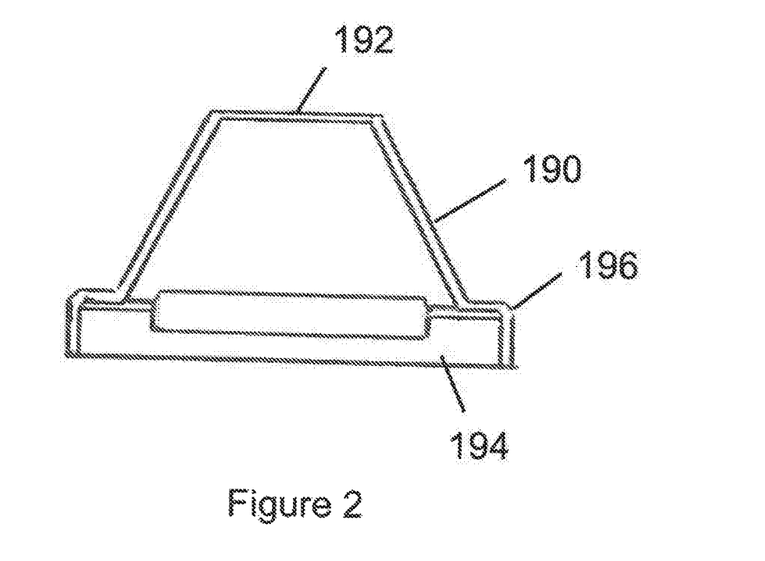
FIG. 2 is a section view through an optional cover for a connector to which the invention may be applied.

In FIG. 2, there is shown an optional shield or guard member 190 which may optionally be used as a cover for the gap 107 in the connector, e.g. for boiler applications. The shield member loosely fits over the upper/gap region of the connector, e.g. so as to prevent items or fingers being inserted into the gap in the flow of potentially hot water being discharged through the connector.

The shield member 190 is formed as a single piece of transparent material.

The shield member 190 in this example has a frustoconical shape having an upper opening 192 which is shaped to fit over the inlet 105. The shield member 190 may have a wider lower opening 194 shaped to sit atop the upper end of the upper chamber wall 165. The shield member in this example has a skirt 196 arranged to sit atop the upper chamber wall 165.

Figure 3:
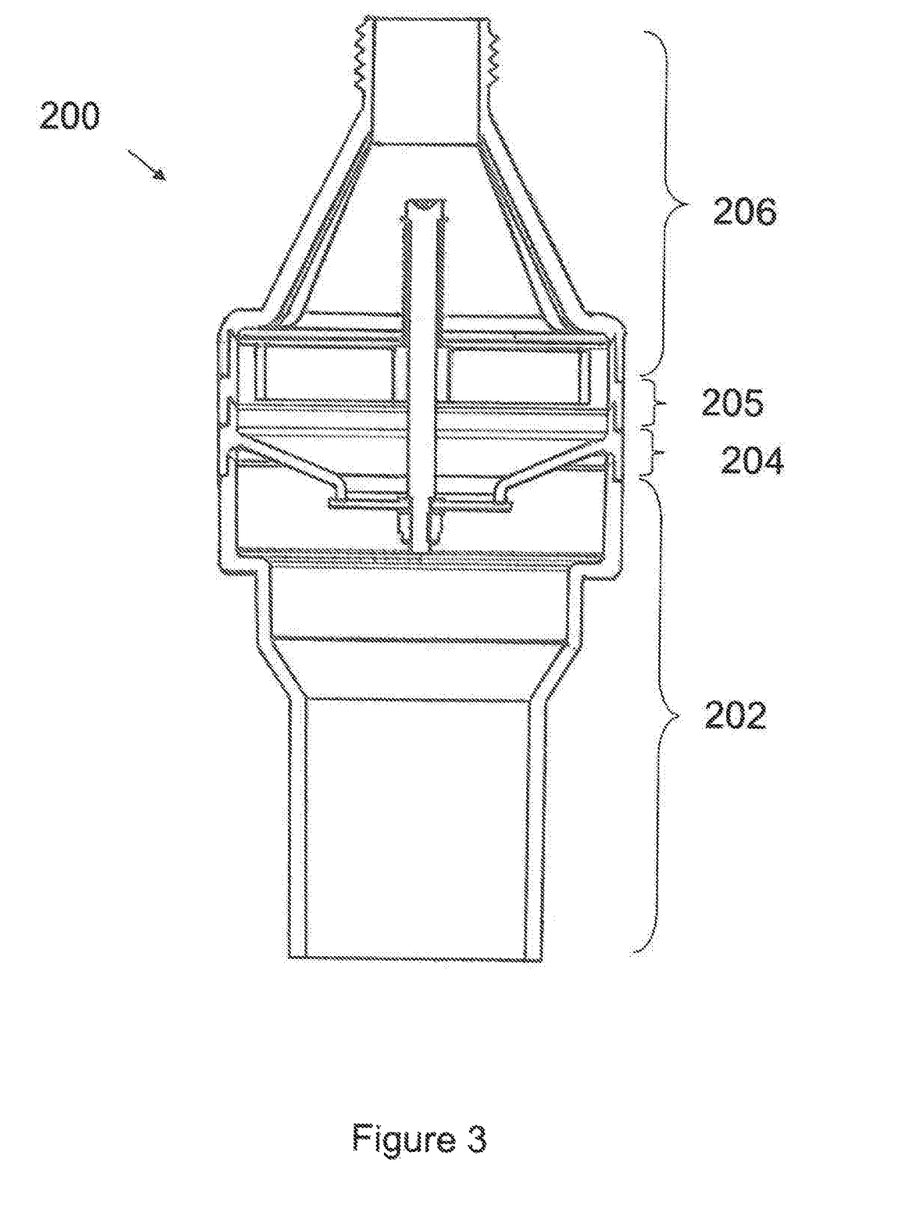
FIG. 3 is a vertical section view through a further connector to which the present invention may be applied.

Turning to FIG. 3, there is shown a further example connector 200. Any of the description of the connector 100 in FIG. 1 may equally apply to connector 200 and will not be repeated for brevity. The connector 200 has a modified outlet formation and may allow greater throughflow of water/liquid.

The bodies of the connectors of FIGS. 1 and 3 may be provided as a single/unitary member to which the valve structure 142 may be applied to as to provide the connector assembly. The connectors may be formed of a plurality of component parts which may be fused/welded together or otherwise joined using adhesive. Friction welding could be used to provide a suitable unitary body. In other examples, the component parts could be threaded and joined together as an assembly, rather than a unitary member.

FIG. 3 shows an example of the different component parts that may be used to form the connector body, comprising: a lower component 202 comprising the lower chamber wall, floor and outlet connector; a first intermediate component 204 comprising an intermediate chamber wall portion and the upper chamber floor or lower chamber ceiling; a second intermediate component 205 comprising an upper chamber wall portion and any ribs for supporting the valve assembly 142; and, an upper component 206 comprising the upper chamber wall, the connecting arms and inlet connector.

Figure 4:
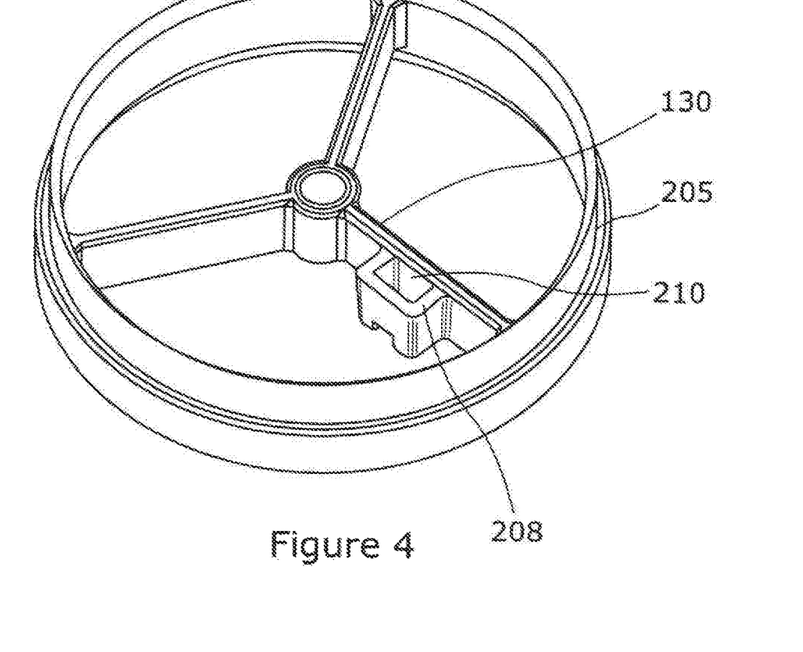
FIG. 4 is a three dimensional view of a mounting for a sensor according to an example of the invention.

Turning to FIG. 4, there is shown an embodiment of the strut 130 and/or intermediate component 205 in which the strut 130 has a retaining formation 208 for a liquid/moisture sensor to be described below. The retaining formation in this example takes the form of a partial enclosure or wall in which a sensor or sensor mounting component can be inserted. The wall is shaped to form an opening 210 by which a sensor can be mounted in the upper chamber.

Figure 5:
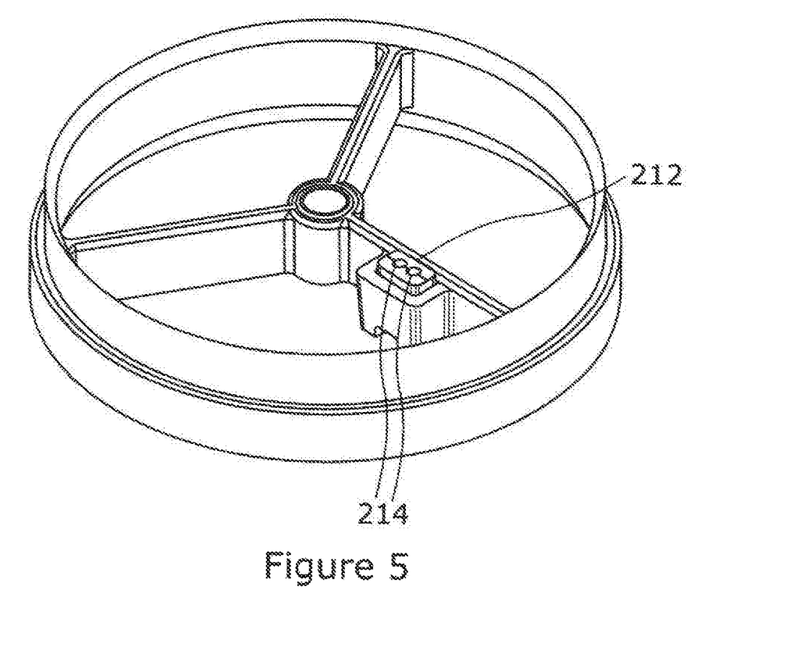
FIG. 5 is a three dimensional view of the mounting of FIG. 4 with a sensor holder in place.

In FIG. 5, there is shown a sensor mounting component 212 located in the opening 210 of the retaining formation 208. The sensor mounting component 212 comprises a wedge-like body having one or more through-bores or open-ended recesses 214. In this example, a pair of through-bores 214 are provided.

The body of component 212 is received in the opening with a friction fit or a clip/snap fit. The mounting component 212 and the recesses therein allow for accurate sensor positioning.

The mounting component may be formed of two opposing parts or halves, which are brought together to trap one or more sensing element there-between. The opposing parts may each be shaped to provide a portion of the through-bore(s) or other retaining formation once brought together.

The sensor mounting component 212 may be referred to as a mounting clip.

An embedded sensing prong/element design is enabled by the above arrangement.

Figure 6:
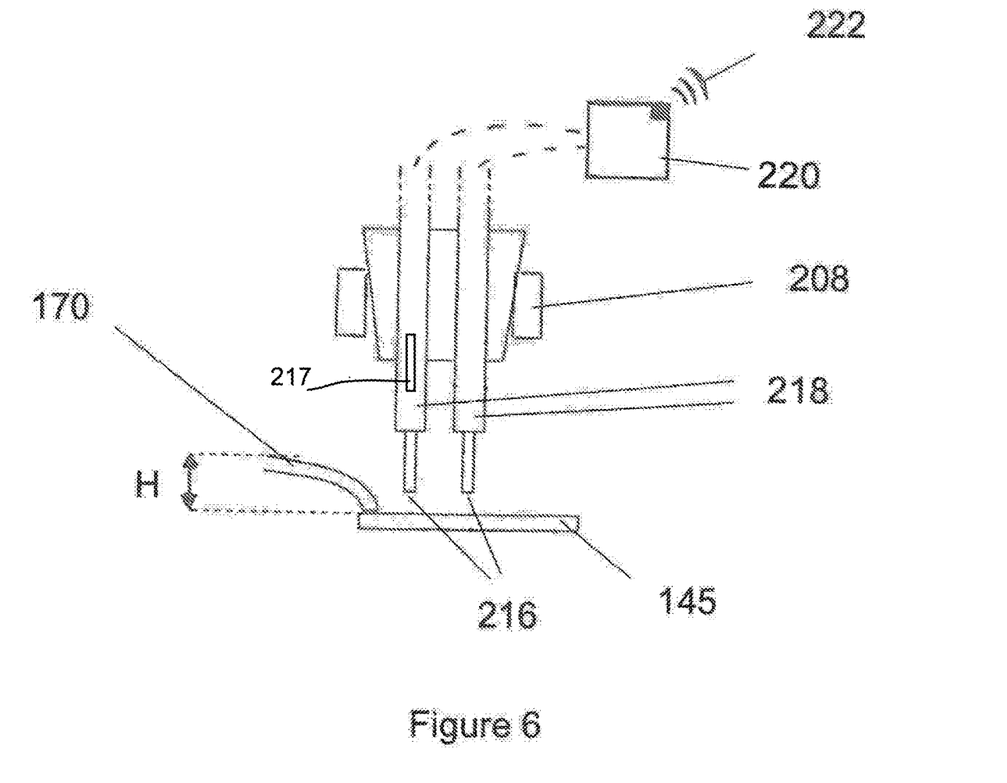
FIG. 6 is a schematic section view through a part of the connector with a sensor in place.

Turning to FIG. 6, one or more sensor element 216 is mounted via the mounting component 212 such that it is suspended from the strut 130. The one or more sensor element is held in the mounting component 212, e.g. in the through-bore(s) 214 thereof. A pair of sensor elements 216 are mounted to the retaining formation 208 in this example.

The/each sensor element 216 takes the form of one or more conductive element, e.g. a conductive prong in this example. The/each prong may be provided by a rigid prong member or an exposed end of a conductive wire. The/each prong 216 may comprise a wire/conductor member contained within an insulating sleeve/sheath 218, e.g. in the form of a conventional wire. The insulating sleeve(s) 218 may extend through the mounting component and may extend to a sensor device 220.

The sensor element(s) 216 is/are connected to the sensor device 220.

The/each sensor element 216 is mounted such that it is held/suspended above the valve member 145, e.g. a small distance above the valve member. The sensor element may be held within the middle chamber 177 of height H, e.g. spaced form the valve member 145 by a height less than the height of water required to open the valve.

The spacing between the/each sensor element 216, e.g. its end, and the valve member may be less than 10 mm and typically less than 8 mm or 6 mm. A spacing of greater than 1 mm or 2 mm may be desirable, e.g. to avoid overly sensitive water detection or inadvertent contact with the valve member 145 itself.

A spacing in the order of 3-5 mm has been found suitable to detect the presence of water prior to opening of the valve but avoiding detection of an insignificant amount of water, e.g. such as a single drop.

The sensor device 220 comprises an electrical/electronic water/moisture detector. The sensor device 220 monitors the resistance between the pair of conductive sensor elements 216. Whilst an air gap is present, the resistance between the elements 216 will be high enough to prevent electrical conduction therebetween. When the ends contact water, the resistance will decrease significantly, allowing electrical current to flow, which can be detected by sensor device 220.

The sensor device 220 may apply an electrical potential difference across the sensor elements 216.

This allows a sensor with low power consumption such that it can be powered by a conventional battery for long periods of time as necessary.

Upon sensing of water in the connector 100, the sensor device 220 outputs a corresponding detection signal. The signal may be output as an electrical signal to monitoring equipment, e.g. via a wired or wireless connection. A wireless signal 222, is depicted in FIG. 6, which may comprise a Bluetooth (RTM) signal, Wi-Fi (RTM) signal or using another suitable wireless communication signal/standard. The sensor device 220 may comprise suitable output/transmission circuitry.

Additionally or alternatively, the signal may comprise a visual or audible alert signal output by an output device of the sensor device itself. A suitable output device may comprise a speaker, light emitting diode or other equivalent device.

A volt-free contact alarm may be implemented according to examples of the invention.

The sensor device 220 may be mounted on the connector itself, e.g. rigidly mounted on a wall of the connector 100, 200 (such as an external wall of the connector), or else removably mounted using a releasable mounting. A single connector design may provide for use either with or without the sensing device 220, sensor elements 216 and/or mounting component 212. Thus a modular design is enabled where in the sensing aspect of the device can be selectively applied to the connector but the connector can equally work without the additional sensing functionality if desired.

In other examples of tundish connector, different valve types may be used, such as a duckbill or trap door valve.

If the struts/ribs 130 described above are not required, a sensor of the type described herein may be mounted on a bespoke rib or else from the arm 125. Alternatively the sensor could be mounted beneath the floor 170 and the sensing conductors/prongs could extend into the middle chamber 177 to sense a pool of water forming on the valve member 145 or flowing through the valve when open.

The monitoring device 224 may be a conventional monitoring device or alarm box as may be mounted in domestic or commercial premises, e.g. for monitoring a boiler or central heating system. Most current units of this type can receive wireless signal inputs such as the output of sensor device 220. However a wired connection could be used if necessary.

Figures 7A, 7B:
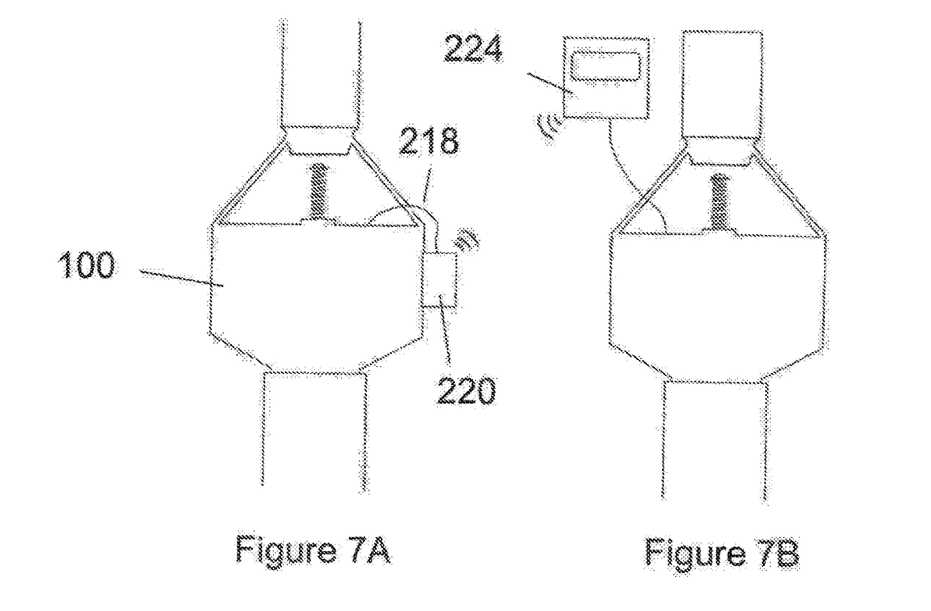
FIGS. 7A and 7B show side views of two example connectors according to the invention in use.

The sensor device 220 may communication with a local monitoring device/unit 224 as shown in FIG. 7A.

FIG. 7B shows another example in which a monitoring device 224 could itself be provided with water detection functionality hard-wired into the unit 224, e.g. by the sensing elements 216, 218 depending from the monitoring unit 224 itself. The monitoring unit could be provided with the logic/control aspect of the sensor device 220.

The monitoring device may comprise a boiler monitoring or control unit, which may report and/or control further aspects of hot water system operation.

In other examples, the sensor device 220 could have a longer/wider range communication capability and could communicate with a remote monitoring facility or a mobile communication device of an owner, operator or monitoring user. However it is envisaged that such communication/reporting operations will be performed by local monitoring unit 224, which may handle a number of other monitoring roles in addition to that of the water sensing for connector 100, 200.

The sensing arrangement described herein is advantageous since it can provide an indication of connector valve operation, e.g. a leak or discharge from a hot water system, when no-one is present to witness the event.

Furthermore the sensor device 220 can output different signals for different types of fluid leak/discharge or different connector valve operation. The sensor device and/or monitoring unit 224 may be provided with one or more modules of computer readable code (e.g. monitoring/diagnosis algorithms) for identification of different potential faults or fault-indicating scenarios. Thus different alert states or alert outputs may be output to indicate a severity or type of problem. This can be beneficial in allowing an operator, user or central monitoring facility in determining how to react to the sensed scenario.

In one alert state, e.g. akin to a very small leak through the inlet, a slow drip of water may collect in the connector interior and may trigger the sensor device 220 briefly before the valve opens to discharge the water. A continued slow drip will take seconds, minutes or hours to amass enough water to trigger the detection of water by the sensor device again. Thus one alert state that can be identified concerns an intermittent water detection of relatively short-lived duration.

This may be identified as a possible minor leak, e.g. from a boiler discharge valve. An intermittent alert state may be reported.

Suitable time thresholds of the intermittency/frequency of water detection may be used to determine the severity of such a leak and the urgency of any maintenance work to resolve the leak. An initial warning level may be set for such a detected scenario, which may be advanced to a higher alert or urgency level for more frequent intermittent water detection.

A second alert state may comprise detection of a more prolonged water discharge but at a frequency of hours or days. For example, if the internal pressure within a boiler exceeds its threshold upon heating of water in the system, it may cause a discharge of a medium volume of liquid over a relatively short time period, such as a single discharge of 1-3 litres of water. This would cause a prolonged opening of the valve and associated water detection by the sensor device 220.

This may be logged as a second type of alert.

If this type of alert is repeated at intervals associated with boiler use, e.g. daily, twice daily or other suitable intervals, then it may be indicative of a pressure instability in the boiler. If undiagnosed, this can be problematic since the discharge will cause a boiler pressure to drop after use and may fall below an acceptable boiler pressure. An uninformed user may attempt to top up the boiler pressure to restart the boiler, thereby repeating the boiler discharge cycle upon heating and thus the problem can be exacerbated over time.

However, when armed with the relevant sensor output according to the present invention, the potential fault can be readily identified. A suitable service/maintenance appointment can be scheduled with the potential fault diagnosed in advance.

A similar scenario could arise due to a constant trickle or drip only whilst the heating of the hot water system is active. Additionally or alternatively, this could be identified as a leaking boiler or hot water system discharge valve.

A further alert state may be generated when a prolonged discharge through the connector is sensed, e.g. of 5, 10, 20 litres or more. This may be equated to a mass discharge from the hot water system that requires urgent attention. This type of alert may carry a higher or highest priority level since it is indicative of a serious fault that will prevent use of the hot water system.

Monitoring of the frequency and/or duration of triggering of sensor may thus provide additional insight. This additional insight is made possible in part by the sensing of a pool of water collecting in the connector causing opening of the valve. Thus a rate/type of discharge can be determined.

User controls may be provided to mute or ignore an alert generated by the system, e.g. upon being acknowledged by the user. Such functionality maybe useful for low priority, ongoing alerts.

Whilst a plurality, e.g. at least two, three, or four, different alert states are discussed above, it is possible that identification of further alert states could be implemented based on frequency, duration of triggering and/or one or more further parameter.

One or more further sensors or sensor types could be used in conjunction with the sensor device 220. A temperature sensor 217 (FIG. 6) may be provided in the connector in addition to, or instead of, the water sensor. Thus, the specific sensing elements 216 described above could be supplemented with, or replaced by, a temperature sensor.

In this manner, the temperature of a discharge from a hot water system and/or boiler can be monitored to provide further insight into the discharge scenario.

For example, a slow, intermittent, or medium discharge at elevated temperature can be diagnosed as a different fault to cold discharge. The latter situation will confirm whether it is the elevated temperature and/or pressure during operation that is leading to the discharge.

In one scenario, an elevated temperature discharge above a threshold temperature may be used to determine a serious failure of the system. For example a discharge at a temperature above a higher safety temperature threshold for the hot water system implies that one or more hot water system safety valve or control measure has failed. A temperature above 90° C. or 95° C. for example should not occur unless a serious failure has arisen.

Thus one or more temperature thresholds may be used as an alert or diagnosis parameter according to aspects of the invention.

The temperature sensor could be held in the connector anywhere it is likely be fluid washed by water flowing through the connector, subject to fluid dynamic considerations. In some examples, the temperature sensor could be suspended in a manner similar to the water sensors described herein.

FIG. 8 shows on example of a combined water and temperature sensing arrangement 300, in which the conductors 302 for sensing the presence of liquid are provided on a common support 304, which in this example takes the form of a printed circuit board. The support 304 can thus be mounted as required in the connector such that the conductor ends are suspended above the valve member 145 so as to be in contact with a pool of liquid forming on the valve member, or e stream of liquid flowing through the device in the event that the valve member is open. The conductors 302 thus replace the use of the prongs 216 described above.

The common support 304 may be suspended from a strut 130, e.g. via a retaining formation 208 as shown, or else may be otherwise affixed to the interior of the connector as required.

The use of a common printed board is beneficial in that a temperature sensor 306 can also be mounted on the same board as shown in FIG. 8. The conductors and temperature sensor may be mounted on the same or opposing sides of the common support.

It is also possible that some of the electronics could be provided on the same board if desired.

Although a combined temperature and moisture sensor is shown in FIG. 8, either sensing components could individually be provided in such an arrangement without the other. Additional, or alternative sensing components could also be considered.

In another example, the sensor may comprise a valve actuation sensor, e.g. arranged to sense operation of the valve from a closed to an open condition, e.g. including the duration of valve operation.

According to aspects of the invention an alert controller may be programmed to output a plurality of different types of alert signal in accordance with any of the parameters or scenarios disclosed above, either alone or in combination.

The invention claimed is:

1. A connector for a water system, the connector comprising:
    an inlet connector, a connector body and an outlet connector arranged in sequence, wherein the connector body is an open-sided tundish having an open air gap between the inlet and outlet connectors through which water can fall in use, and a sensor mounted to the connector between the inlet and outlet connectors for detecting the presence of water within the connector body,
    wherein the connector body comprises a non-return valve between the inlet connector and outlet connector beneath the open air gap, and
    wherein the sensor is arranged to sense water falling through the open air gap within the connector body or the presence of a pool of water forming on the non-return valve.

2. A connector according to claim 1, wherein the non-return valve is arranged to divide the interior of the connector body into upper and lower internal chamber portions.

3. A connector according to claim 2, wherein the sensor is arranged to sense the presence of water on or above the non-return valve.

4. A connector according to claim 3, wherein the sensor is suspended above the non-return valve.

5. A connector according to claim 3, wherein the sensor is mounted above the non-return valve.

6. A connector according to claim 1, wherein the sensor comprises a moisture sensor and a temperature sensor.

7. A connector according to claim 6, wherein the moisture sensor and the temperature sensor are mounted to a common support.

8. A connector according to claim 7, wherein the support comprises a printed circuit board.

9. A connector according to claim 1, wherein the sensor comprises a pair of spaced conductors.

10. A connector according to claim 1, wherein the sensor comprises a valve operation sensor.

11. A connector according to claim 1, further comprising a monitoring device arranged to monitor an output of the sensor and to generate an alert signal based on the output.

12. A connector according to claim 11, wherein the monitoring device is arranged to output a plurality of different alert signals according to sensor outputs comprising at least one of:
    a frequency of sensing the presence of water,
    a duration of sensing the presence of water, or
    one or more thresholds of a sensed condition/parameter.

13. A connector according to claim 12, wherein the plurality of different alert signals comprise a plurality of different alert priority levels according to one or more sensed conditions/parameters.

14. A water system monitor comprising the connector according to claim 11, wherein the monitoring device is remote of the connector and in signal communication with the sensor.

15. A monitoring device for a hot water system arranged to receive sensor readings from the sensor of the connector according to claim 1, the monitoring device comprising a processor having machine readable instructions for processing received sensor readings indicative of the presence of water in the connector and outputting a plurality of different alert signals according to at least one of a duration or frequency of the sensed presence of water.

16. A connector according to claim 1, wherein the connector body comprises a retaining formation arranged to retain the sensor or a sensor mounting component inside the connector body.

17. A connector according to claim 16, wherein the connector body comprises an intermediate component, and the intermediate component comprises the retaining formation.

18. A connector for a water system, the connector comprising:
    an inlet connector, a connector body and an outlet connector arranged in sequence, wherein the connector body is open-sided so as to form a tundish having an open air gap between the inlet and outlet connectors through which water can fall in use, the connector comprising a sensor mounted inside the connector body for detecting the presence of water within the connector body, wherein the sensor comprises a water sensor and a temperature sensor.

* * * * *